UNITED STATES PATENT OFFICE.

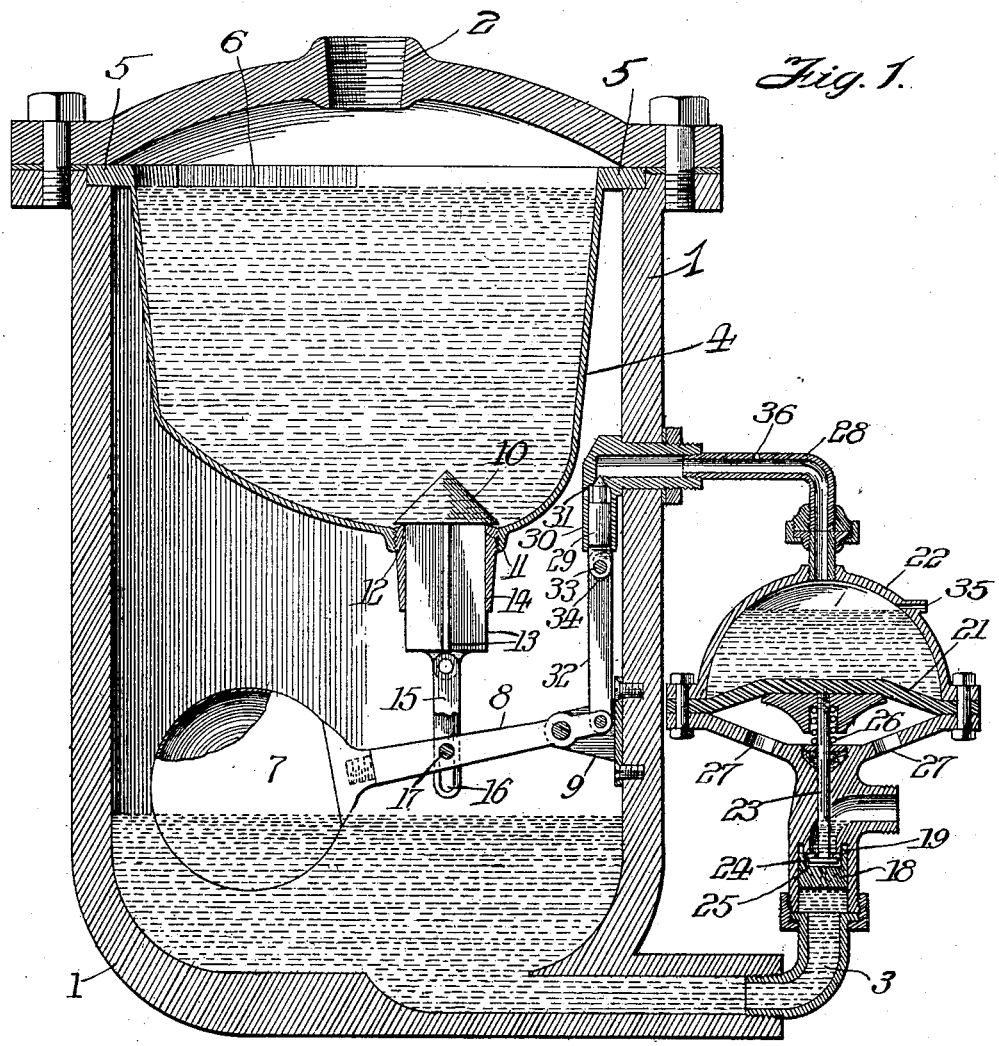
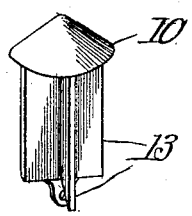
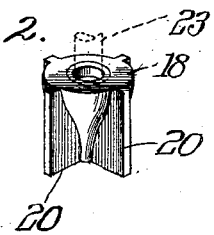

CLIFFORD C. HUMBERSTONE, OF LA GRANGE, ILLINOIS.

TRAP.

969,282.

Specification of Letters Patent.

Patented Sept. 6, 1910.

Application filed May 29, 1908. Serial No. 435,699.

*To all whom it may concern:*

Be it known that I, CLIFFORD C. HUMBERSTONE, a citizen of the United States, residing at La Grange, in the county of Cook and State of Illinois, have invented certain new and useful Improvements in Traps, of which the following is a specification.

This invention relates to automatic means for receiving and periodically discharging the condensation occurring in a system of steam or air pipes, and its object is to improve such devices with a view to obtaining simplicity and durability of construction and positive, reliable operation.

In the accompanying drawings, Figure 1 is a vertical central section through an apparatus embodying the features of my invention. Figs. 2 and 3 are detail perspective views of valves comprised in the device.

The embodiment selected for illustration comprises a trap body 1 provided with an inlet 2 by means of which it may be connected with a system of pipes from which condensation or other liquid is to be removed. The lower end of the trap body has an outlet passage 3. Within the trap body and below the inlet 2, a vessel 4 is supported by any suitable means, such as a plurality of lugs 5. The vessel 4, in this instance, is arranged directly beneath the inlet opening, and when said vessel is filled the condensation overflows at 6 into the lower part of the trap body. The action of the valve that controls the discharge from the trap is governed by a float 7 carried by an arm 8 which is pivotally supported in this instance upon a bracket 9 fixed to the trap body. 10 is a valve controlling an outlet opening 11 in the lower end of the vessel 4. The seat 12 for the valve 10 is preferably made of knife-edge form, as shown, in order that sediment shall not interfere with the proper seating of said valve. The valve 10 is provided with guide wings 13 slidably mounted in the tubular guide 14. A link 15 is pivotally connected with the valve 10 and has in its lower portion an elongated opening 16 within which lies a pin 17 fixed to the arm 8. A valve 18 adapted to seat upon the valve seat 19 controls the discharge through the outlet 3. 20 are guide rings upon the valve 18. Said valve is operated by a diaphragm 21 located within a diaphragm chamber 22 and connected with said valve by means of a rod 23. Preferably a limited relative movement is permitted between the rod 23 and the valve 18, as, for example, by forming a head 24 upon the lower end of said rod, said head lying within a recess 25 in said valve. A spring 26 tends to elevate the diaphragm 20 and seat the valve 18.

The space within the diaphragm chamber 22 below the diaphragm communicates with the atmosphere through the openings 27, while the space above the diaphragm is arranged to be placed in communication with a source of pressure fluid, in this instance with the interior of the trap body 1, by means of a pipe 28. Communication between the trap body and the diaphragm chamber 22 is controlled by a valve 29 slidably mounted in a valve casing 30. Said valve casing communicates with the interior of the trap body through one or more openings 31. The valve 29 is connected with the arm 8 by means of a link 32. A slight amount of relative movement between the valve 29 and said link is provided for, the connection between said parts, as shown, consisting of a pin 33 fixed to the valve and extending into an elongated opening 34 in the link. The steam pressure tends to hold the valve 29 seated.

In the diaphragm chamber 22 is an outlet 35 for pressure fluid and any condensation that may occur in said chamber. 36 is an air vent to permit the water to drain from said chamber through the outlet 35.

The trap body being connected with the system being drained, the interior of said body is under the pressure existing in said system. The condensation flowing into the vessel 4 overflows into the lower part of the trap body until the float 7 is raised sufficiently to unseat the valve 10, whereupon the water in said vessel is rapidly discharged through the opening 11, causing the float to rise quickly and unseat the valve 29. The diaphragm 21 is thereby placed under fluid pressure, the valve 18 is unseated, and the water from the trap body is discharged through the outlet 3 until the level of the water in said trap body falls a little below that shown in Fig. 1, when the valves 10 and 29 are closed through the descent of the float 7. As soon as pressure is cut off from the diaphragm chamber 22 the pressure of the water upon the valve 18, assisted by the spring 26, seats said valve 18. Water again begins to accumulate in the vessel 4 and the cycle of operation just described is repeated.

I claim as my invention:

1. In a trap, in combination, two containers, the fluid overflowing from one container into the other, the latter having an outlet; a float in said latter container arranged to cause a discharge from the other container; and means controlled by said float for controlling said outlet.

2. In a trap, in combination, a body having an inlet and an outlet; a valve controlling said outlet; a diaphragm connected with said valve; means for conducting pressure fluid from said body to one side of said diaphragm; a valve in said conducting means; a float in said body for operating the last mentioned valve; and a receptacle arranged to receive the fluid entering through the inlet to the body, said float being arranged to cause a discharge from said receptacle.

3. In a trap, in combination, a body having an inlet and an outlet; a stationary receptacle in said body arranged to receive the fluid entering through said inlet, said receptacle having an outlet in its lower portion; a valve controlling said outlet; a float in said body for unseating said valve; and means controlled by the float for controlling the outlet from the body.

4. In a trap, in combination, a body having an inlet and an outlet; a receptacle arranged to receive the fluid entering through said inlet; an arm pivoted at a point between its ends in said body; a float carried by said arm; said receptacle having an outlet; a valve for said outlet; a connection between said valve and said arm at one side of its pivotal center; and devices controlling the outlet from said body, said devices including a valve connected with said arm at the other side of its pivotal center.

5. In a trap, in combination, a body having an inlet and an outlet; a stationary receptacle in said body arranged to receive the fluid entering through said inlet, said receptacle having an outlet in its lower end; a valve controlling the outlet from said receptacle, the fluid accumulating in said receptacle overflowing into said trap body; a diaphragm chamber; a diaphragm in said chamber; a valve in the outlet from said body; a connection between said last mentioned valve and said diaphragm; a connection between said diaphragm chamber and the trap body; a valve controlling the last mentioned connection; an arm pivotally mounted in said trap body and connected with the last mentioned valve and the valve for said receptacle, the connections between said valves and said arm permitting relative movement between said valves and said arm; and a float carried by said arm.

6. A steam trap body having an inlet in its upper end and an outlet in its lower portion, and a receptacle stationarily fixed in said body below said inlet, said receptacle having two points of discharge into said trap body.

7. A steam trap comprising a body having an inlet; a receptacle in said body for the fluid entering through said inlet, said receptacle having two points of discharge into said body; a valve for one of said points of discharge; and a float in said body for operating said valve.

8. A steam trap comprising a container; a fluid-receiver having two points of discharge into said container; and a float in said container for controlling one of said points of discharge.

9. A steam trap body having an inlet in its upper portion and an outlet in its lower portion, and a receptacle stationarily fixed in said trap body below said inlet, said receptacle being arranged to overflow into said trap body, and said receptacle having a valved discharge opening in its lower portion.

10. In a trap, in combination, a body having an inlet; a receptacle arranged to receive the fluid entering through said inlet; an outlet from the lower end of said receptacle to said body; an outlet from the lower end of said body; and a single float in said body controlling said outlets.

11. In a trap, the combination of means forming a closed casing with a chamber for liquid in the upper part thereof, liquid being allowed to overflow from said chamber to the lower part of said casing; inlet means for said casing adapted to deliver liquid to said chamber; outlet means for discharging liquid from the lower part of said casing; a valve normally closing an outlet from said chamber below the point of overflow adapted to discharge liquid therefrom into the lower part of the casing; a valve normally closing the said outlet from the lower part of the casing; and means acted upon by the accumulated liquid overflowing from said chamber into the casing adapted to cause the successive opening of said valves in the order in which they are named.

CLIFFORD C. HUMBERSTONE.

Witnesses:
C. Paul Parker,
George L. Chindahl.